United States Patent
Kaneko et al.

(10) Patent No.: US 8,028,028 B2
(45) Date of Patent: *Sep. 27, 2011

(54) MESSAGE CHARACTER STRING OUTPUT SYSTEM, CONTROL METHOD THEREOF, AND INFORMATION STORAGE MEDIUM

(75) Inventors: Motoki Kaneko, Minato-ku (JP); Norio Kawamoto, Minato-ku (JP); Takao Yamagishi, Minato-ku (JP); Katsutoshi Komatsu, Minato-ku (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 1012 days.

This patent is subject to a terminal disclaimer.

(21) Appl. No.: 11/887,508

(22) PCT Filed: Feb. 16, 2006

(86) PCT No.: PCT/JP2006/302740
§ 371 (c)(1),
(2), (4) Date: Sep. 28, 2007

(87) PCT Pub. No.: WO2006/103843
PCT Pub. Date: Oct. 5, 2006

(65) Prior Publication Data
US 2009/0271482 A1    Oct. 29, 2009

(30) Foreign Application Priority Data
Mar. 28, 2005  (JP) .................................. 2005-092536

(51) Int. Cl.
*G06F 15/16* (2006.01)
(52) U.S. Cl. ...................................... 709/206
(58) Field of Classification Search ................... 709/206
See application file for complete search history.

(56) References Cited

U.S. PATENT DOCUMENTS

| | | | |
|---|---|---|---|
| 6,790,142 B2* | 9/2004 | Okada et al. | 463/42 |
| 2002/0013174 A1* | 1/2002 | Murata | 463/42 |
| 2002/0046102 A1* | 4/2002 | Dohring et al. | 705/14 |
| 2003/0105669 A1 | 6/2003 | Tsuchiya | |
| 2003/0172291 A1 | 9/2003 | Judge et al. | |

(Continued)

FOREIGN PATENT DOCUMENTS

CA  2420391 A1  8/2004

(Continued)

OTHER PUBLICATIONS

Extended European Search Report dated Sep. 16, 2008.

(Continued)

*Primary Examiner* — Larry Donaghue
(74) *Attorney, Agent, or Firm* — Sughrue Mion, PLLC (57) ABSTRACT

A message string output system which can prevent users from feeling uncomfortable due to repeated input of a particular string by another user is provided. A judging unit (36) judges whether or not a message string which is input by an input unit (30) contains a specific string. An input status information updating unit (38) updates, based on a judgment result by the judging unit (36), input status information stored in an input status information storage (46) in corresponding to user identification information corresponding to the message string. An output form determining unit (43) determines an output form of a specific string part contained in the message string based on the input status information stored in correspondence with the user identification information corresponding to the message string.

8 Claims, 6 Drawing Sheets

U.S. PATENT DOCUMENTS

| | | | |
|---|---|---|---|
| 2003/0195801 A1* | 10/2003 | Takakura et al. | 705/14 |
| 2003/0216961 A1* | 11/2003 | Barry | 705/14 |
| 2005/0020289 A1 | 1/2005 | Kim et al. | |
| 2005/0044154 A1 | 2/2005 | Kaminski et al. | |
| 2005/0119936 A1* | 6/2005 | Buchanan et al. | 705/14 |
| 2005/0216346 A1* | 9/2005 | Kusumoto et al. | 705/14 |
| 2009/0228556 A1* | 9/2009 | Kaneko | 709/206 |

FOREIGN PATENT DOCUMENTS

| | | |
|---|---|---|
| JP | 2001-222596 A | 8/2001 |
| JP | 2003-85433 A | 3/2003 |
| JP | 3424822 B2 | 7/2003 |
| JP | 2003-223401 A | 8/2003 |
| JP | 2003-242397 A | 8/2003 |
| TW | 488954 B | 6/2002 |
| TW | 592759 B | 6/2004 |

OTHER PUBLICATIONS

Makoto Sano, "A Text Mining System with Affect Lexicon for Qualitative Analysis of Free Text", Information Processing Society of Japan Symposium Series, Nov. 26-27, 2003, p. 219-226, vol. 2003, No. 18.

Kenji Tateishi et al., "Opinion Information Retrieval from the Internet", Information Processing Society of Japan Kenkyu Hokoku, Jul. 16, 2001, pp. 75-82, vol. 2001, No. 69.

* cited by examiner

| USER ID | POINT AMOUNT OUTSTANDING |
|---|---|
| U001 | 10 |
| U002 | 30 |
| U003 | 25 |

FIG.6

| SPECIFIC STRING ID | SPECIFIC STRING | BASE POINT AMOUNT |
|---|---|---|
| S001 | DRINK A | 1 |
| S002 | GAME B | 3 |
| S003 | MAGAZINE C | 5 |

FIG.7

| USER ID | SPECIFIC STRING ID |
|---|---|
| U001 | S001, S003 |
| U002 | S001 |
| U003 | S002 |

FIG.8

| USER ID | SPECIFIC STRING ID | NUMBER OF INPUTS | PREVIOUS INPUT DATE |
|---|---|---|---|
| U001 | S001 | 1 | ... |
| U001 | S003 | 3 | ... |
| U002 | S001 | 2 | ... |
| ... | ... | ... | ... |

FIG.9

| NUMBER OF INPUTS | POINT PROVISION COEFFICIENT |
|---|---|
| ONCE | 1.0 |
| TWO-FIVE TIMES | 0.5 |
| SIX OR MORE TIMES | 0 |

FIG.10

| DATE | USER ID | SPECIFIC STRING ID | PROVIDED POINT AMOUNT |
|---|---|---|---|
| ... | U001 | S003 | 5 |
| ... | U003 | S002 | 3 |
| ... | U003 | S002 | 6 |

FIG.11

| NUMBER OF INPUTS | FONT SIZE |
|---|---|
| ONCE | S1 |
| TWO-FIVE TIMES | S2 |
| SIX OR MORE TIMES | S3 |

FIG.12

| USER ID | MESSAGE STRING | FONT SIZE |
|---|---|---|
| S001 | DRINK A TASTES GOOD. | ( 1, 3, S2 ) |
| S002 | ... | ... |
| S003 | ... | ... |

MESSAGE CHARACTER STRING OUTPUT SYSTEM, CONTROL METHOD THEREOF, AND INFORMATION STORAGE MEDIUM

TECHNICAL FIELD

The present invention relates to a message string output system, a control method of a message string output system, and an information storage medium.

BACKGROUND ART

Systems are known in which a server is connected to a communication network such as the Internet and access from a plurality of terminals such as a home game machine, a personal computer or the like to the server is allowed, to enable communication among users in distant locations. For example, a message string output system is known in which, when a user inputs a message string, the message string is output on another terminal so that players can enjoy chatting. [Patent Document 1] JP 3424822 B

DISCLOSURE OF THE INVENTION

Problems to be Solved by the Invention

In such a message string output system, a user may feel uncomfortable when another user repeatedly inputs a particular string. Therefore, it is necessary to prevent the users from feeling uncomfortable due to another user repeatedly inputting a particular string.

By the way, because the message string output system as described above is used by many users, such a system can be expected to become an effective place for advertisement activities. In particular, such a system is highly anticipated as a place for advertisement through word-of-mouth communication. Therefore, in the message string output system, a configuration may be employed in which points are provided to users who have input a specific string (name of goods, name of service, a keyword, a catch phrase, etc.) to improve inputting motivation of a user for the specific string. That is, a configuration may be considered to promote input of the name of goods or the like in the chat and enable active advertisement through the word-of-mouth communication. When such a message string output system is to be realized, it is necessary to prevent users from feeling uncomfortable due to unnecessary and repeated input of the name of goods or the like by other users.

The present invention has been conceived in view of the above-described circumstances, and an advantage of the present invention is that a message string output system, a control method of a message string output system, and an information storage medium are provided which can prevent users from feeling uncomfortable due to repeated input of a particular string by other users.

Means for Solving the Problems

According to one aspect of the present invention, there is provided a message string output system which comprises a plurality of input means and output control means for causing a message string which is input by the input means to be output to at least output means corresponding to other input means among the plurality of input means, the message string output system comprising specific string storage means for storing a specific string; input status information storage means for storing input status information which indicates an input status of the specific string in correspondence with user identification information; user identification information acquiring means for acquiring user identification information corresponding to a message string which is input by the input means; judging means for judging whether or not the message string which is input by the input means contains a specific string stored in the specific string storage means; and input status information updating means for updating, based on a judgment result by the judging means, the input status information stored in the input status information storage means in correspondence with the user identification information acquired by the user identification information acquiring means, wherein the output control means comprises output form determining means for determining an output form of a specific string part contained in the message string which is input by the input means, based on the input status information stored in the input status information storage means in correspondence with the user identification information acquired by the user identification information acquiring means.

According to another aspect of the present invention, there is provided a method of controlling a message string output system which comprises a plurality of input means and causes a message string which is input by the input means to be displayed on at least display means corresponding to other input means among the plurality of input means, the control method comprising a user identification information acquiring step in which user identification information corresponding to a message string which is input by the input means is acquired; a judging step in which it is judged whether or not the message string which is input by the input means contains a specific string stored in a specific string storage means which stores a specific string; an input status information updating step in which input status information stored in an input status information storage means, which stores, in correspondence with user identification information, input status information which indicates an input status of the specific string, in correspondence with the user identification information acquired in the user identification information acquiring step is updated based on a judgment result in the judging step; and an output form determining step in which an output form of a specific string part contained in the message string which is input by the input means is determined based on input status information stored in the input status information storage means in correspondence with the user identification information acquired in the user identification information acquiring step.

According to another aspect of the present invention, there is provided a program for causing a computer to function as a message string output system which comprises a plurality of input means and output control means for causing a message string which is input by the input means to be output to at least output means corresponding to other input means among the plurality of input means, and also to function as specific string storage means for storing a specific string; input status information storage means for storing input status information which indicates an input status of the specific string in correspondence with user identification information; user identification information acquiring means for acquiring user identification information corresponding to a message string which is input by the input means; judging means for judging whether or not the message string which is input by the input means contains a specific string stored in the specific string storage means; and input status information updating means for updating, based on a judgment result by the judging means, the input status information stored in the input status information storage means in correspondence with the user identification information acquired by the user identification information acquiring means, wherein the output control means comprises output form determining means for determining an output form of a specific string part contained in the message string which is input by the input means, based on the input status information stored in the input status information storage means in correspondence with the user identification information acquired by the user identification information acquiring means.

According to another aspect of the present invention, there is provided a computer readable information storage medium which stores the above-described program. According to another aspect of the present invention, there is provided a program distributing apparatus comprising an information storage medium storing the above-described program, for reading the program from the information storage medium and distributing the program. According to another aspect of the present invention, there is provided a program distributing method, while using an information storage medium storing the above-described program, for reading the program from the information storage medium and distributing the program.

The present invention relates to a message string output system which comprises a plurality of input means and which outputs a message string which is input by the input means to at least output means corresponding to other input means. According to various aspects of the present invention, a specific string is stored and input status information which indicates an input status of a specific string is stored in correspondence with user identification information. When a message string is input, it is judged whether or not the message string contains the specific string. The input status information stored in correspondence with the user identification information corresponding to the message string is updated based on the judgment result. An output form of a specific string part contained in the message string is determined based on the input status information stored in correspondence with the user identification information corresponding to the message string. According to this aspect of the present invention, it is possible to prevent users from feeling uncomfortable due to another user repeatedly inputting a specific string.

In one example of the present invention, the input status information may include information which indicates a number of times that the judging means judges that the message string contains the specific string.

In another example of the present invention, the output form of the specific string part may be a font size of the specific string part.

In still another example of the present invention, the output form of the specific string part may be a display color of the specific string part.

In still another example of the present invention, the output control means may cause an image in which a message string image representing the message string which is input by the input means is synthesized to a given image in a semitransparent manner to be displayed on at least display means corresponding to other input means among the plurality of input means, and the output form determining means may determine a proportion of the semitransparent synthesis of the part of the message string image corresponding to the specific string part, based on the input status information stored in the input status information storage means in correspondence with the user identification information acquired by the user identification information acquiring means.

In yet another example of the present invention, the message string output system may comprise point information storage means for storing point information in correspondence with user identification information; and point information updating means for updating, according to the judgment result by the judging means, point information stored in the point information storage means in correspondence with the user identification information acquired by the user identification information acquiring means, based on the input status information stored in the input status information storage means in correspondence with the user identification information.

BEST MODE FOR CARRYING OUT THE INVENTION

An example of an embodiment of the present invention will now be described with reference to the drawings. In the following description, an example configuration is described in which the present invention is applied to a network game system which is one form of a message string output system.

Figure 1:
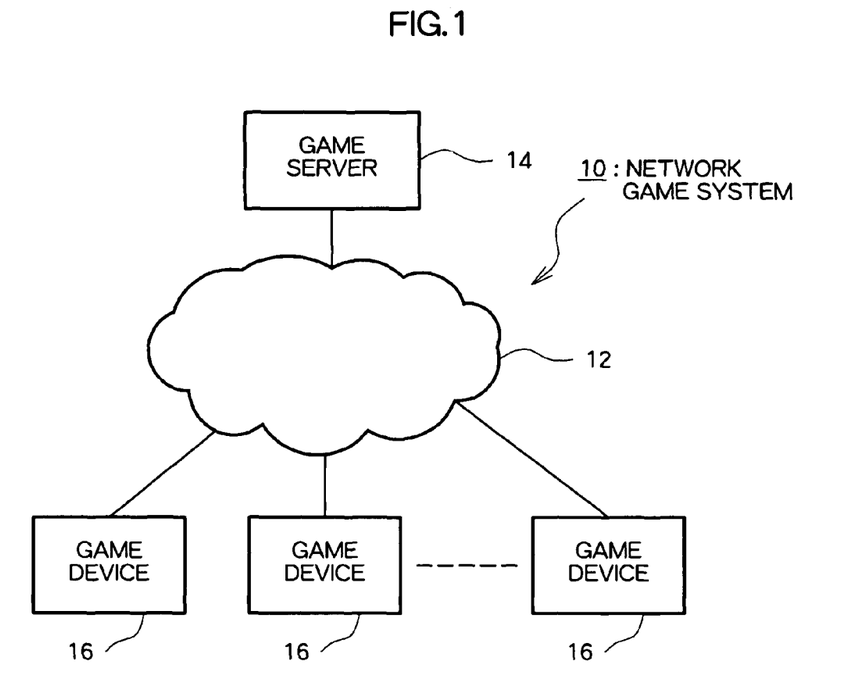
FIG. 1 is a diagram showing an overall structure of a network game system according to an embodiment of the present invention.

FIG. 1 is a diagram showing an overall structure of a network game system according to an embodiment of the present invention. As shown in FIG. 1, the network game system 10 comprises a game server 14 and a plurality of game devices (terminals) 16. The game server 14 and the game device 16 are connected to a communication network 12 such as the Internet and can transmit and receive data between each other. The game server 14 may be, for example, a computer system comprising a conventionally known server computer. The game device 16 may be, for example, a computer system comprising a conventionally known personal computer, a conventionally known home game machine, a conventionally known portable game machine, a conventionally known personal digital assistant, a conventionally known portable phone, or the like.

Figure 2:
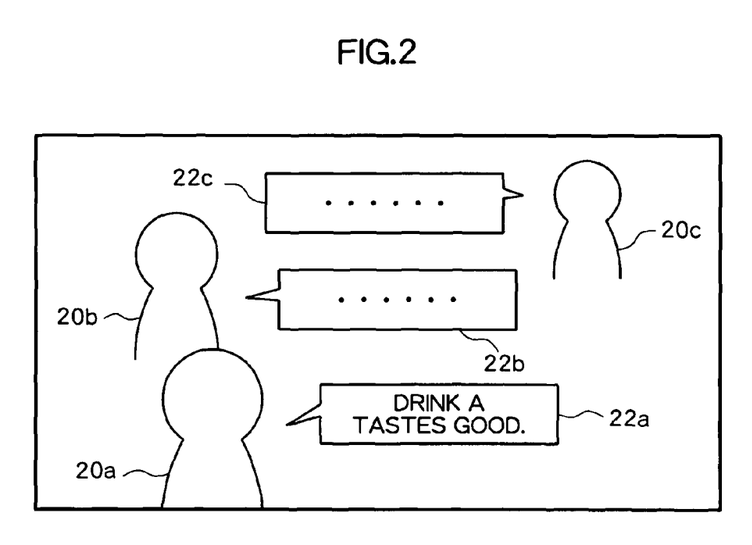
FIG. 2 is a diagram showing an example game screen.

FIG. 2 shows an example game screen displayed on each game device 16. As shown in FIG. 2, game characters 20a, 20b, and 20c are displayed on the game screen. More specifically, a game character (for example, the game character 20a) corresponding to the game device 16 and game characters (for example, game characters 20b and 20c) corresponding to other game devices 16 are displayed. The game character corresponding to the game device 16 is, for example, a game character to be controlled by the user who uses the game device 16. In other words, the game character corresponding to the game device 16 is the game character controlled by the controller of the game device 16.

In addition, balloon images 22a, 22b, and 22c are displayed on the game screen. The balloon image 22a is a balloon image corresponding to the game character 20a. Similarly, the balloon image 22b is a balloon image corresponding to the game character 20b and the balloon image 22c is a balloon image corresponding to the game character 20c. A display position of the balloon image is determined based on a display position of the game character corresponding to the balloon image. A message string which is input by the user is displayed in the balloon of the balloon image. In other words, when a message string is input from a game device 16, the message string is displayed in the balloon, of the balloon image corresponding to the game device 16, on the game device 16 and/or other game devices 16.

In the network game system 10 having such a structure, users can chat and communicate with each other. In addition, in the network game system 10, each user can make a contract with one or a plurality of advertisers, and points are provided to users who use a specific string (for example, name of goods, name of service, keyword, or catch phrase, etc.) designated by the contracted advertiser in the chat. The "point" described herein includes others which are referred to by names such as "coins" and "medals", and may be used as a currency in the game or may be exchangeable for goods and services in the real world. In this manner, the network game system 10 is configured to improve the input motivation of a user for a specific string such as the name of goods, or the like, and input of the name of the goods, or the like, in the chat. As a result, active advertisement through word-of-mouth communication is promoted.

Figure 3:
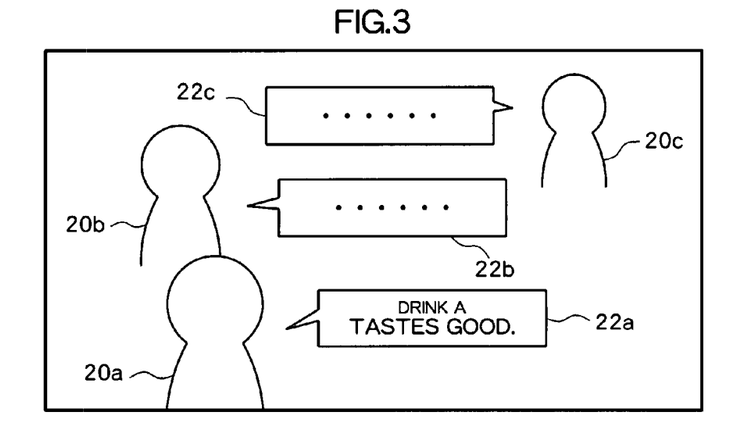
FIG. 3 is a diagram showing an example game screen.

In such a network system 10, it can be imagined that a user who thinks to acquire more points might unnecessarily and repeatedly inputs the specific string. Therefore, the system must be configured to prevent other users from feeling uncomfortable even when such a repeated input is executed. In consideration of this, the network game system 10 is configured such that, when a user inputs a specific string, the font size of the specific string is changed based on a number of times the specific string is input by the user in the past. More specifically, when the number of inputs in the past is increased, for example, the font size of the specific string ("DRINK A" in FIG. 3) is reduced as shown in FIG. 3.

Figure 4:
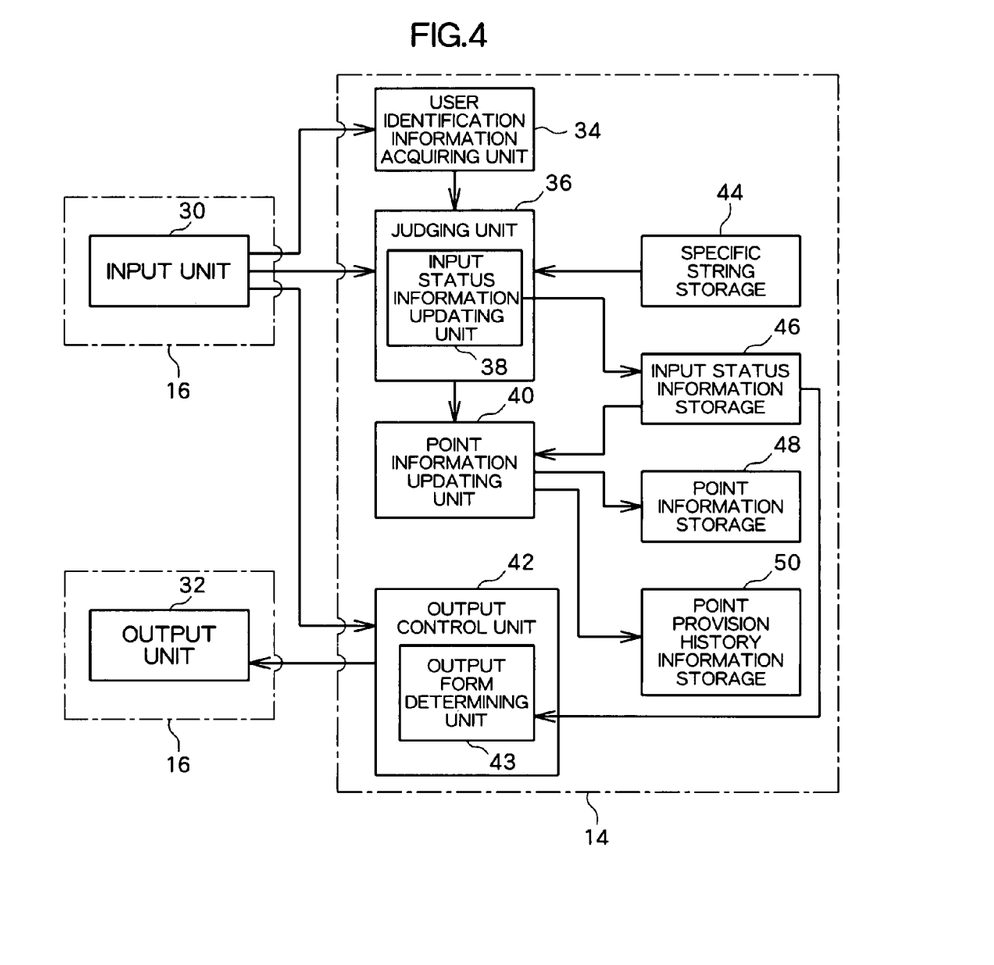
FIG. 4 is a functional block diagram of a network game system according to the embodiment of the present invention.

A functional structure of the network game system 10 will now be described. FIG. 4 primarily shows functional blocks, among the functional blocks realized in the network game system 10, related to the present invention. These functions are realized by the game server 14 and the game device 16 executing a program supplied through information storage media such as CD-ROMs, DVD-ROMs or the like, or through the communication network 12.

As shown in FIG. 4, the network game system 10 comprises an input unit 30, an output unit 32, a user identification information acquiring unit 34, a judging unit 36, a point information updating unit 40, an output control unit 42, a specific string storage 44, an input status information storage 46, a point information storage 48, and a point provision history information storage 50. In the following description, a configuration is exemplified in which the input unit 30 and the output unit 32 are provided in each game device 16 and the other functional blocks are provided in the game server 14, but each of the functional blocks may be provided in either one of the game server 14 and the game device 16. For example, it is possible to employ a configuration in which the user identification information acquiring unit 34, the judging unit 36, and the specific string storage 44 are provided in the game device 16. In this case, the judging unit 36 may transmit a judgment result to the game server 14 through the communication network 12. The judging unit 36 may transmit the judgment result each time the judging unit 36 judges (that is, each time a message string is input). Alternatively, the judging unit 36 may store a history of judgment results and transmit the history at a predetermined time (for example, at the time of completion of the chat).

[1. Point Information Storage]

The point information storage 48 is realized with a known hard disk storage device and a known database management system. The point information storage 48 stores point information in correspondence with user identification information. The user identification information is information which directly or indirectly identifies a user. The user identification information may be, for example, information which identifies the game device 16. The point information is, for example, numerical information or the like indicating an amount outstanding of points.

Figure 5:
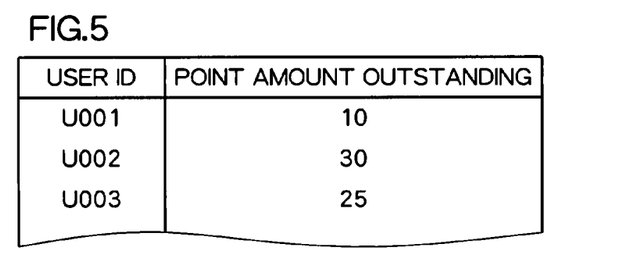
FIG. 5 is a diagram showing an example of a point amount outstanding table.

In the present embodiment, a point amount outstanding table shown in FIG. 5, for example, is stored in the point information storage 48. The point balance table of FIG. 5 includes a user ID field and a point amount outstanding field. The user ID field stores a user ID. The user ID is information which uniquely identifies a user. The point amount outstanding field stores information indicating an amount of points owned by the user.

[2. Specific String Storage]

The specific string storage 44 is realized with a known hard disk storage device and a known database management system. The specific string storage 44 stores one or a plurality of specific strings in correspondence with the user identification information. The specific string storage 44 also stores point change information in correspondence with each specific string.

Figure 6:
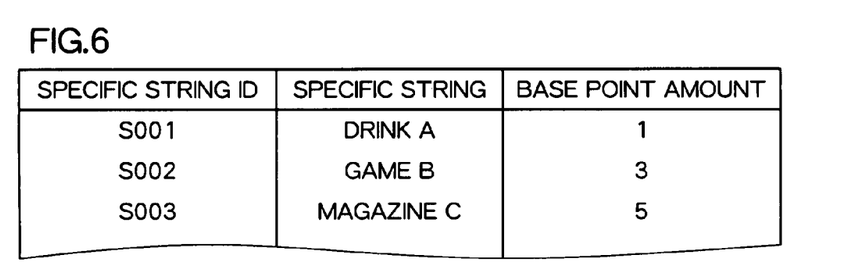
FIG. 6 is a diagram showing an example of a specific string table.

In the present embodiment, a specific string table shown in FIG. 6, for example, is stored in the specific string storage 44. The specific string table of FIG. 6 includes a specific string ID field, a specific string field, and a base point amount field. The specific string ID field stores a specific string ID. The specific string ID is information which uniquely identifies a specific string. The specific string field stores a specific string. The specific string is a specific string formed including one or a plurality of characters. The specific string is a string related to, for example, goods and services. More specifically, the specific string may be a name of goods, a name of a service, a keyword, a catch phrase, etc.

The base point amount field stores numerical information (point change information) forming a basis for determining an amount of points to be provided to a user who has input the specific string. The numerical value stored in the base point amount field (base point amount) may be determined, for example, based on a length (a number of characters) of the specific string. For example, because a longer specific string requires a larger amount of work for input, the base point amount for such a specific string may be increased so that more points are provided to the user. Alternatively, the base point amount may be determined based on the types of characters included in the specific string. For example, because a specific string which includes a larger number of character types such as the Japanese Hiragana characters, Kanji, Chinese characters, numbers, alphabets, and signs requires a larger amount of work for input, the base point amount for such a specific string may be increased so that a larger amount of points are provided to the user.

Figure 7:
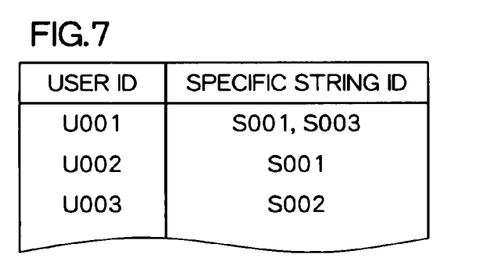
FIG. 7 is a diagram showing an example of a user specific string table.

The specific string storage 44 also stores a table of correspondence between a user and a specific string. For example, the specific string storage 44 stores a user specific string table as shown in FIG. 7. The user specific string table of FIG. 7 includes a user ID field and a specific string ID field. The user ID field stores a user ID. The specific string ID field stores a specific string ID (or specific string IDs) of one or a plurality of specific strings correlated to the user. More specifically, the specific string ID of the specific string designated by the advertiser with whom the user has made a contract is stored.

[3. Input Unit]

The input unit 30 is a unit for inputting a message string. The input unit 30 is realized, for example, with a keyboard. Alternatively, the input unit 30 may be realized with a microphone and software which converts a voice which is input through the microphone into a string (text). Alternatively, it is also possible to employ a configuration in which the message string can be input by sequentially designating characters from characters displayed on a display, using a display position designating unit such as a mouse, a game controller or the like.

The message string which is input by the input unit 30 is transmitted to the game server 14 through the communication network 12. In the present embodiment, a user ID of the user who has input the message string is transmitted along with the message string.

[4. User Identification Information Acquiring Unit]

The user identification information acquiring unit 34 acquires user identification information corresponding to the message string which is input from the input unit 30. In other words, the user identification information acquiring unit 34 acquires user identification information of a user who has input the message string. In the present embodiment, the user ID which is received along with the message string is acquired by the user identification information acquiring unit 34.

[5. Judging Unit]

The judging unit 36 judges whether or not the message string which is input by the input unit 30 contains one or more specific strings stored in the specific string storage 44. In the present embodiment, the judging unit 36 judges whether or not the message string which is input by the input unit 30 contains one or more specific strings stored in the specific string storage 44 in correspondence with user identification information acquired by the user identification information acquiring unit 34. In the present embodiment, the judgment by the judging unit 36 is executed based on the specific string table and the user specific string table. This process will be described later in more detail (refer to FIGS. 13 and 14).

The judging unit 36 includes an input status information updating unit 38. The input status information updating unit 38 updates input status information stored in the input status information storage 46 based on the judgment result by the judging unit 36. This process will be described later in more detail (refer to FIGS. 13 and 14).

[6. Input Status Information Storage]

The input status information storage 46 is realized with a known hard disk storage device and a known database management system. The input status information storage 46 stores, in correspondence with user identification information, input status information indicating an input status of the specific string stored in the specific string storage 44. The input status information includes, for example, information indicating a number of times the judging unit 36 judges that the message string contains the specific string.

Figure 8:
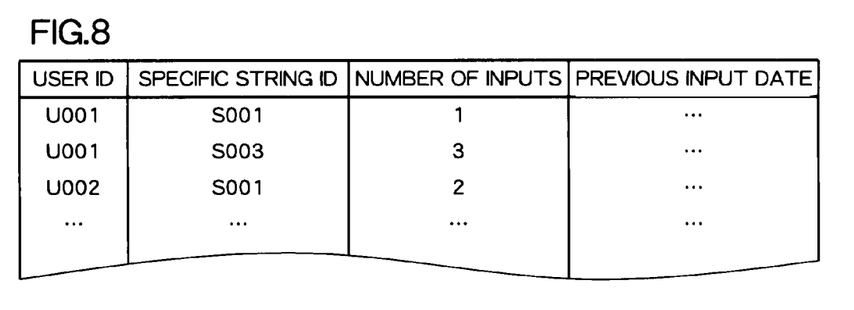
FIG. 8 is a diagram showing an example of a specific string input status table.

In the present embodiment, a specific string input status table shown in FIG. 8 is stored in the input status information storage 46. The specific string input status table of FIG. 8 includes a user ID field, a specific string ID field, a number-of-inputs field, and a previous input date field. The user ID field stores the user ID. The specific string ID field stores the specific string ID. The number-of-inputs field stores a number of times the user has input the specific string. The previous input date field stores a date and time of the previous input of the specific string by the user.

[7. Point Information Updating Unit]

The point information updating unit 40 updates the point information stored in the point information storage 48 in correspondence with the user identification information acquired by the user identification information acquiring unit 34, based on a judgment result by the judging unit 36. For example, the point information updating unit 40 may be configured such that, when it is judged that the message string which is input by the input unit 30 contains the specific string stored in the specific string storage 44, the updating process is executed based on the point change information stored in correspondence with the specific string.

Figure 9:
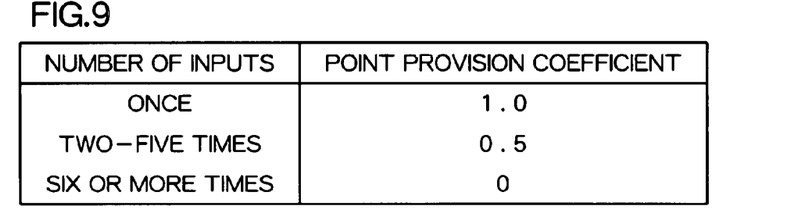
FIG. 9 is a diagram showing an example of a point provision coefficient table.

The point information updating unit 40 may execute the update based on the input status information stored in the input status information storage 46 in correspondence with the user identification information acquired by the user identification information acquiring unit 34. The point information updating unit 40 in the present embodiment stores, for example, a point provision coefficient table as shown in FIG. 9. The point provision coefficient table of FIG. 9 includes a number-of-inputs field and a point provision coefficient field. The number-of-inputs field stores information indicating a range of a number of inputs of the specific string. The point provision coefficient field stores numerical information indicating the point provision coefficient. The point provision coefficient is numerical information which forms a basis for determining an amount of points to be provided to the user. The point provision coefficient is provided such that, for example, the points provided to the user are limited when the number of inputs is increased.

The point information updating unit 40 of the present embodiment provides, when it is judged that the message string contains the specific string, points to the user who has input the message string. Specifically, the point information updating unit 40 increases the value of the point amount outstanding field of the point information table corresponding to the user ID acquired by the user identification information acquiring unit 34. The amount of increase is determined based on the base point amount field of the specific string table and the point provision coefficient field of the point provision coefficient table. Details of this process will be described later (refer to FIGS. 13 and 14).

[8. Point Provision History Information Storage]

Figure 10:
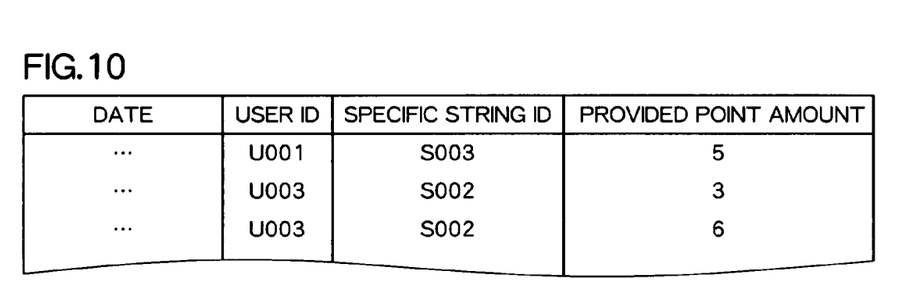
FIG. 10 is a diagram showing an example of a point provision history table.

The point provision history information storage 50 is realized with a known hard disk storage device and a known database management system. The point provision history information storage 50 stores point provision history information. In the present embodiment, a point provision history table as shown in FIG. 10, for example, is stored in the point provision history information storage 50. The point provision history table of FIG. 10 includes a date field, a user ID field, a specific string ID field, and a provided point amount field. The date field stores information indicating the date and time when the point is provided to the user. The user ID field stores the user ID of the user to which the point is provided. The specific string ID field stores a specific string ID of a specific string which is input by the user. The provided point amount field stores information indicating an amount of points provided to the user.

It is also possible to output a summarized result of the point provision history table. For example, a total of the amount of provided points for each specific string may be calculated and provided to the advertiser. Advertisement billing may be executed based on the summarized result. Alternatively, for example, it is also possible to calculate a total of the amount of provided points for each combination of a user and a specific string, and provide the total to the user and the advertiser. With this configuration, it is possible to allow, for example, awarding of a special offer or the like by the advertiser to the user obtaining a large amount of points.

[9. Output Control Unit]

The output control unit 42 causes a message string which is input by the input unit 30 to be output on the output unit 32 of at least one game device 16. For example, the output control unit 42 causes a message string which is input by a certain game device 16 to be displayed on an output unit 32 of at least one other game device 16.

The output control unit 42 comprises an output form determining unit 43. The output form determining unit 43 determines an output form (for example, font size, display size, color, transparency, output volume, etc. or a combination thereof) of a specific string part of the message string based on the input status information stored in the input status information storage 46 in correspondence with the user identification information acquired by the user identification information acquiring unit 34. For example, the output form determining unit 43 determines the transparency of the specific string part of the message string based on the input status information. More specifically, when an image in which a message string image representing a message string which is input by a certain game device 16 is synthesized with a given image in a semitransparent manner is displayed on the output unit 32 of at least one other game device 16, the output form determining unit 43 determines the proportion of the semitransparent synthesis of a part of the message string image corresponding to the specific string part (proportion of the semitransparent synthesis of the part of the message string image corresponding to the specific string part on the given image) based on the input status information. Alternatively, for example, the output form determining unit 43 may determine a combination of the font size and transparency of the specific string part of the message string based on the input status information. Thus, with such a configuration, it is possible to reduce the font size of the specific string part of the message string and increase the transparency at the same time, based on the input status information.

Figure 11:
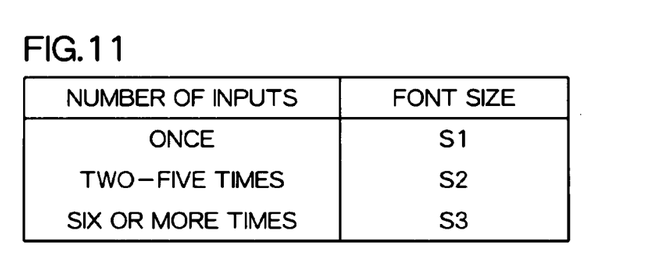
FIG. 11 is a diagram showing an example of a font size table

The output form determining unit 46 in the present embodiment determines a font size of the specific string part of the message string. The output form determining unit 43 of the present embodiment has, for example, a font size table as shown in FIG. 11. The font size table shown in FIG. 11 includes a number-of-inputs field and a font size field. The number-of-inputs field stores information indicating a range of the number of inputs of the specific string. The font size field stores information indicating a font size of the specific string part of the message string. In the example table of FIG. 11, S2 indicates a font size which is smaller than S1 and S3 indicates a font size which is smaller than S2. In other words, in the example table of FIG. 11, the font size of the specific string part is reduced as the number of inputs of the specific string is increased.

Figure 12:
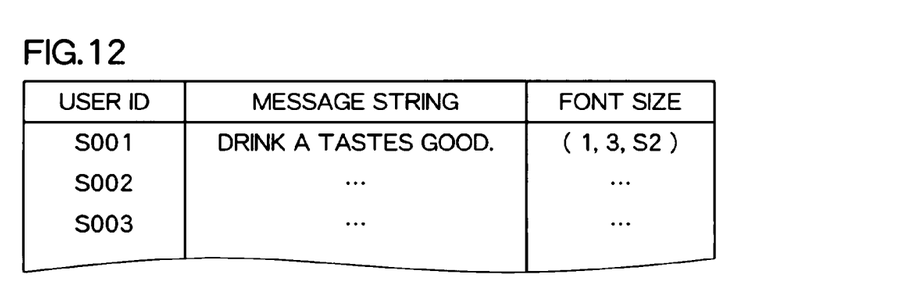
FIG. 12 is a diagram showing an example of a message string table.

The output control unit 42 of the present embodiment stores, for example, a message string table shown in FIG. 12. The message string table of FIG. 12 includes a user ID field, a message string field, and a font size field. The user ID field stores the user ID. The message string field stores the message string which is input by the user. The font size field stores font size information. The font size information is information in which information for identifying a specific string part in the message string and information indicating a font size of the specific string part are combined. More specifically, the font size information is information in which a start position of the specific string part in the message string, a number of characters of the specific string part, and the font size are combined. In the example table of FIG. 12, font size information (i,j,k) indicates that the font size of i-th character to (i+j−1)-th character of the message string is k. For example, when the message sting is "DRINK A TASTES GOOD.", the font size information (1, 3, S2) indicates that the characters forming the specific string part "DRINK A" of the message string are to be displayed with a font size of S2. When the message string contains a plurality of specific strings (including a case where a same specific string appears multiple times), font size information for each of the plurality of specific strings is stored in the font size field. In other words, a plurality of font size information items are stored. The output control unit 42 distributes game data indicating the contents of the message sting table to the game devices 16.

[10. Output Unit]

The output unit 32 is realized with, for example, a display unit such as a display or a voice output unit such as a speaker, and outputs the message string which is input by the input unit 30. In particular, the output unit 32 outputs, with respect to the specific string part contained in the message string which is input by the input unit 30, in an output form determined by the output form determining unit 43. The output unit 32 of the present embodiment displays, for example, a game screen as shown in FIGS. 2 and 3 based on the game data transmitted from the game server 14. In particular, the output unit 32 of the present embodiment displays the specific string part contained in the message string which is input by the input unit 30 with a font size determined by the output form determining unit 43.

Figure 13:
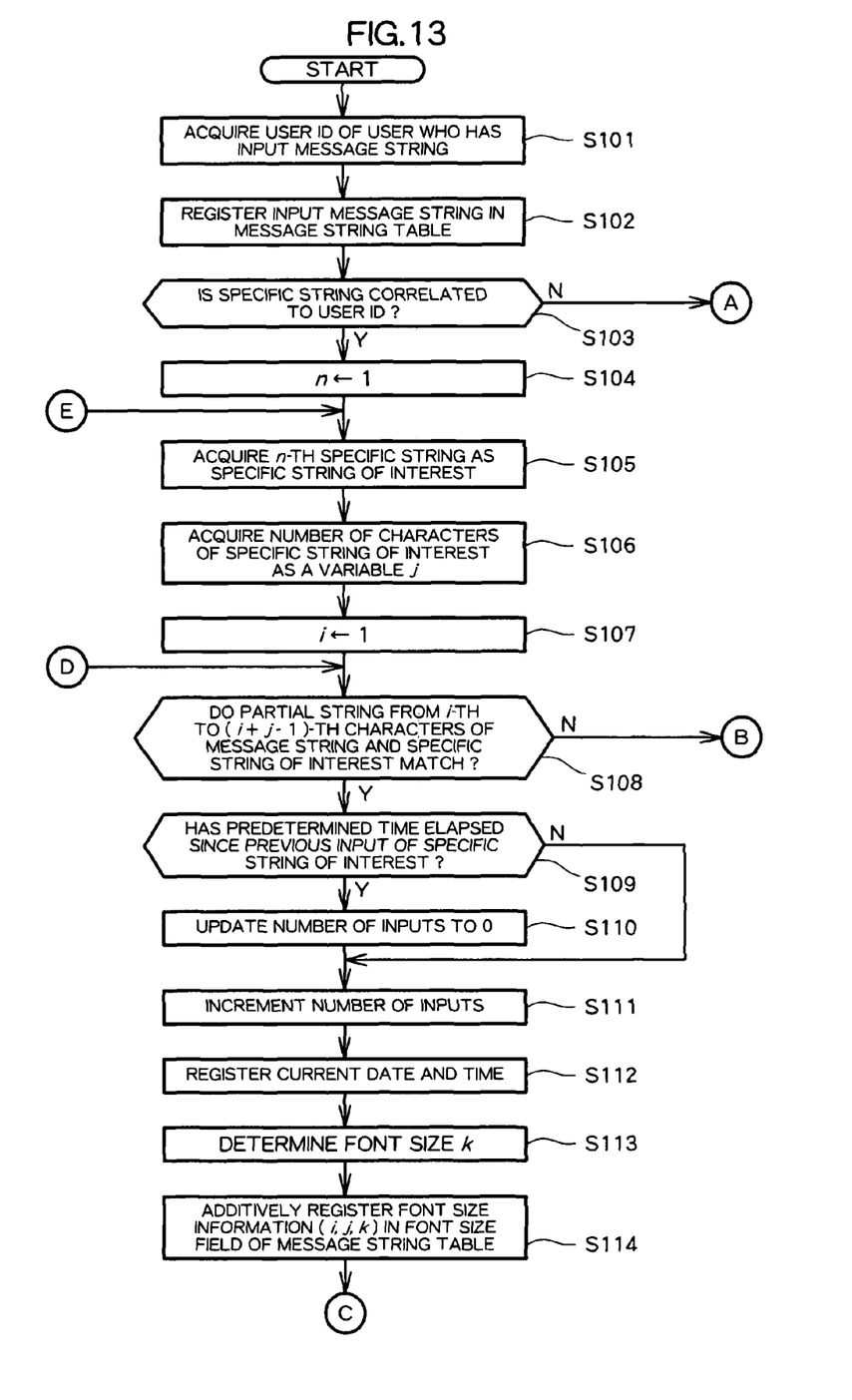
FIG. 13 is a flowchart showing a process executed at a game server.
Figure 14:
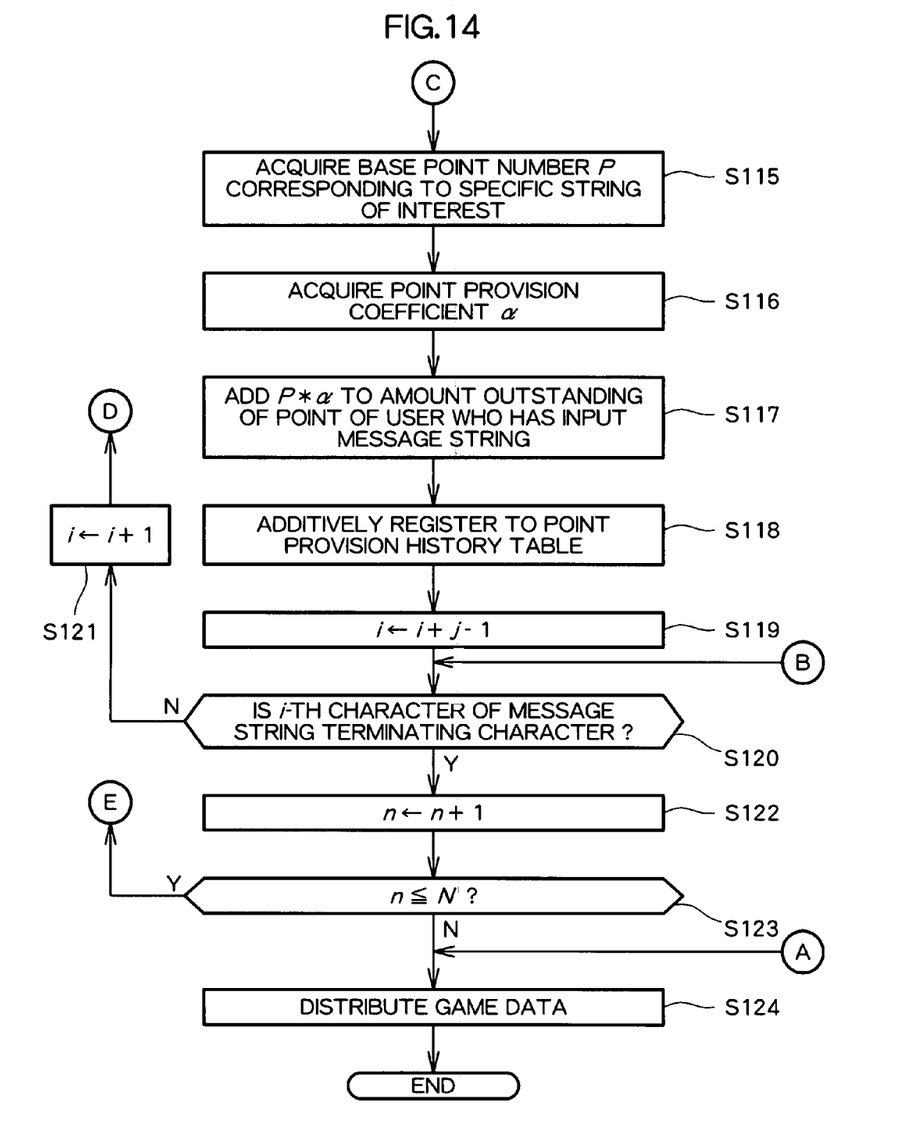
FIG. 14 is a flowchart showing a process executed at a game server.

Next, a process executed by the game server 14 when a message string is input will be described. FIGS. 13 and 14 show a flowchart of this process.

As shown in FIG. 13, in this process, first, the user identification information acquiring unit 34 acquires a user ID of a user who has input the message string (S101). In addition, the output control unit 42 stores the input message string in the message string field of the message string table corresponding to the acquired user ID (S102). In this case, the output control unit 42 clears a font size field corresponding to the acquired user ID.

The judging unit 36 then judges whether or not a specific string is correlated to the acquired user ID (S103). When the judging unit 36 judges that a specific string is correlated, the judging unit 36 initialized a variable n to 1 (S104).

The judging unit 36 then acquires a n-th specific string among the specific strings correlated to the acquired user ID as a specific string of interest (S105). The judging unit 36 next acquires a number of characters forming the specific string of interest as a variable j (S106). The judging unit 36 then initializes a variable i to 1 (S107).

The judging unit 36 judges whether or not a partial string of i-th to (i+j−1)-th characters of the message string matches the specific string of interest (S108).

When it is judged that the partial string and the specific string of interest match, the input status information updating unit 38 judges whether or not a predetermined time has elapsed since the date of previous input of the specific string of interest by the user who has input the message string (S109). More specifically, the input status information updating unit 38 reads the specific string input status table, acquires the previous input date and time based on the content of the previous input date field corresponding to a combination of the user ID acquired in S101 and the specific string ID of the specific string of interest, and judges whether or not a predetermined time has elapsed since the previous input date and time.

When it is judged that the predetermined time has elapsed since the previous input date and time, the input status information updating unit 38 updates, in the specific string input status table, a value of the number-of-inputs field corresponding to the combination of the user ID acquired in S101 and the specific string ID of the specific string of interest to 0 (S110).

When it is judged that a predetermined time has not elapsed since the previous input date and time, or when the process of S110 is executed, the input status information updating unit 38 increments, in the specific string input status table, a value of the number-of-inputs field corresponding to the combination of the user ID acquired in S101 and the specific string ID of the specific string of interest (S111). The input status information updating unit 38 also stores, in the specific string input status table, the current date and time in the previous input date field corresponding to the combination of the user ID acquired in S101 and the specific string ID of the specific string of interest (S112).

Then, the output form determining unit 43 determines the font size of the part of the message string corresponding to the specific string of interest (S113). More specifically, the output form determining unit 43 reads the specific string input status table, acquires a value (number of inputs) of the number-of-inputs field corresponding to the combination of the user ID acquired in S101 and the specific string ID of the specific string of interest, reads the font size table, and acquires the font size k corresponding to the acquired number of inputs.

The output form determining unit 43 additively registers, in the message string table, the font size information (i,j,k) in the font size field corresponding to the user ID acquired in S101 (S114).

The point information updating unit 40 then acquires a base point amount P corresponding to the specific string of interest (S115). More specifically, the point information updating unit 40 reads the specific string table and acquires a value of the base point amount field corresponding to the specific string ID of the specific sting of interest. In addition, the point information updating unit 40 acquires a point provision coefficient $\alpha$ (S116). More specifically, the point information updating unit 40 reads the specific string input status table, acquires a value (number of inputs) of the number-of-inputs field corresponding to the combination of the user ID acquired in S101 and the specific string ID of the specific string of interest, reads the point provision coefficient table, and acquires the point provision coefficient $\alpha$ corresponding to the number of inputs.

The point information updating unit 40 then adds an amount of points obtained by multiplying the base point amount P and the point provision coefficient $\alpha$ to the value of the point amount outstanding field of the point information table corresponding to the user ID acquired in S101 (S117).

The point information updating unit 40 then adds a record to the point provision history table (S118). In this case, information indicating the date and time at this time is stored in the date field of the record to be newly added. The user ID acquired in S101 is stored in the user ID field. The specific string ID of the specific string of interest is stored in the specific string ID field. A value obtained by multiplying the base point amount P and the point provision coefficient $\alpha$ is stored in the provided point amount field.

The judging unit 36 then updates the variable i with a value of (i+j−1) (S119), and judges whether or not the i-th character of the message string is the terminating character (S120). When the i-th character of the message string is not the terminating character, the judging unit 36 increments the variable i (S121). Then, the processes of S108-S120 are executed again.

When the judging unit 36 judges that the i-th character of the message string is the terminating character, on the other hand, the judging unit 36 increments the variable n (S122) and judges whether or not the variable n is less than or equal to N (S123). The number N indicates a number of specific strings correlated to the user ID acquired in S101. When the judging unit 36 judges that the variable n is less than or equal to N, the processes of S105-S123 are executed again.

When, on the other hand, the judging unit 36 judges that the variable n is greater than N or when the judging unit 36 judges in S103 that no specific string is correlated, the output control unit 42 generates game data based on the contents of the message string table and distributes the game data to the game devices 16 (S124).

The above-described processes are realized by the game server 14 executing a program which is supplied through an information storage medium such as a CD-ROM or the like, or through the communication network 12.

As described, in the network game system 10, when a user inputs a message string containing a specific string, points are provided to the user. Because of this, with the network game system 10, it is possible to increase an input motivation of a user for the message string including the specific string. As a result, by setting a keyword or the like related to advertisement as the specific string, it is possible to promote an active advertisement through the word-of-mouth communication.

In addition, the network game system 10 is configured such that, when a specific string is input by a user, the font size of the specific string is changed based on the number of inputs of the specific string by the user in the past. More specifically, as the number of inputs is increased, the font size of the specific string is reduced. Because of this, it is possible to prevent the other users from feeling uncomfortable, even when a certain user unnecessarily and repeatedly inputs the specific string.

Moreover, the network game system 10 is configured such that the provided points to the user are limited, when the specific string is input by the user, based on the number of inputs of the specific string by the user in the past. More specifically, the amount of points to be provided is reduced, or the provision of points itself is inhibited. As a result, it is possible to appropriately provide points to the user.

The present invention is not limited to the preferred embodiment described above.

Figure 15:
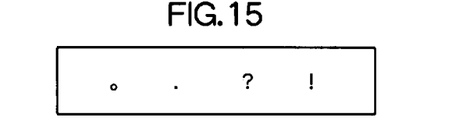
FIG. 15 is a diagram showing an example of a character which indicates a separation of message string.

For example, in the above-described embodiment, the number of inputs of the specific string is reset at a time when a predetermined time has elapsed from the previous input date and time (refer to S110 of FIG. 13). In other words, the limitation on the display of the specific string and the limitation on the point provision due to the number of inputs of the specific string are removed when a predetermined time has elapsed since the previous input date and time. However, the resetting of the number of inputs (limitation removal) may be executed at any time. For example, the number of inputs may be reset at a time when a predetermined character (for example, a character indicating a separation in the message string such as a character shown in FIG. 15, a line feed character or the like) is detected in the message string. In this manner, a display limitation or point provision limitation may be imposed for the specific string which is repeatedly input in one sentence. Alternatively, for example, the number of inputs may be reset based on the position of the specific string. More specifically, the number of inputs may be reset based on a distance (number of characters) between specific strings. For example, it is possible to employ a configuration in which, when a distance between specific strings in the message string is a predetermined distance or larger, the display limitation and the point provision limitation for the later specific strings may be removed. In other words, the display limitation and the point provision limitation are not imposed on the later specific strings.

Alternatively, it is also possible to employ a configuration in which the output form determining unit 43 may be provided in the game device 16. In this case, various information required by the output form determining unit 43 for determining the output form may be transmitted to the game device 16 as a part of the game data.

Alternatively, it is also possible to not provide the game server 14. In this case, the functional blocks described above as being provided in the game server 14 may be provided in each game device 16.

The application of the present invention is not limited to a network game system, and the present invention may be applied to other message output systems.

The invention claimed is:

1. A message string output system comprising:
   a plurality of game devices networked in a network game system, each of said game devices including an input unit, the message string output system comprising:
   an output control unit that causes a message string which is input by the input unit of one of said plurality of game devices to be output to output unit of another of said plurality of game devices;
   specific string storage that stores a specific string;
   input status information storage that stores input status information which indicates an input status of the specific string in correspondence with user identification information;
   a user identification information acquiring unit that acquires user identification information corresponding to a message string which is input by the input unit;
   a judging unit that judges whether the message string which is input by the input unit contains a specific string stored in the specific string storage; and
   an input status information updating unit that updates, based on a judgment result by the judging unit, the input status information stored in the input status information storage in correspondence with the user identification information acquired by the user identification information acquiring unit, wherein
   an input status information updating unit that updates, based on a judgment result by the judging unit, the input status information stored in the input status information storage in correspondence with the user identification information acquired by the user identification information acquiring unit, wherein
   the output control unit comprises an output form determining unit that determines an output form of a specific string part contained in the message string which is input by the input unit of said one of said plurality of game devices, based on the input status information stored in the input status information storage in correspondence with the user identification information acquired by the user identification information acquiring unit, so as to display the specific string part on the output unit of said another of said plurality of game devices.

2. The message string output system according to claim 1, wherein
   the input status information includes information which indicates a number of times that the judging unit judges that the message string contains the specific string.

3. The message string output system according to claim 1, wherein
   the output form of the specific string part comprises a font size of the specific string part.

4. The message string output system according to claim 1, wherein
   the output form of the specific string part comprises a display color of the specific string part.

5. The message string output system according to claim 1, wherein
   the output control unit causes an image in which a message string image representing the message string which is input by the input means is synthesized to a given image in a semitransparent manner to be displayed on at least a display unit corresponding to the other input unit, and
   the output form determining unit determines a proportion of the semitransparent synthesis of the part of the message string image corresponding to the specific string part, based on the input status information stored in the input status information storage in correspondence with the user identification information acquired by the user identification information acquiring unit.

6. The message string output system according to claim 1, further comprising:
   point information storage that stores point information in correspondence with user identification information; and
   a point information updating unit that updates, according to the judgment result by the judging unit, point information stored in the point information storage in correspondence with the user identification information acquired by the user identification information acquiring unit, based on the input status information stored in the input status information storage unit in correspondence with the user identification information.

7. A method of controlling a message string output system including a plurality of game devices networked in a network game system, each of said game devices including an input unit, the control method comprising:
   causing a message string which is input by the input unit to be displayed on a display unit of another of said plurality of game devices
   acquiring from a storage user identification information corresponding to a message string which is input by the input unit;
   judging step in a processor whether the message string input by the input unit contains a specific string stored in a specific string storage which stores a specific string;
   updating input status information stored in an input status information storage, which stores, in correspondence with user identification information, input status information which indicates an input status of the specific string, in correspondence with the user identification information acquired in the acquiring, the updating based on a judgment result in the judging; and determining an output form of a specific string part contained in the message string which is input by the input unit based on the input status information stored in the input status information storage in correspondence with the user identification information acquired in the acquiring unit, so as to display the specific string part on the output unit of said another of said plurality of game devices.

8. A non-transitory computer readable information storage medium which stores a program for causing a computer to function as a message string output system which comprises a plurality of game devices networked in a network game system, each of said game devices including an input means, and also to function as:

an output control means for causing a message string which is input by the input unit of one of said plurality of game devices to be output to output unit of another of said plurality of game devices specific string storage means for storing a specific string;

input status information storage means for storing input status information which indicates an input status of the specific string in correspondence with user identification information;

user identification information acquiring means for acquiring user identification information corresponding to a message string which is input by the input unit;

judging means for judging whether or not the message string which is input by the input unit contains a specific string stored in the specific string storage means; and input status information updating means for updating, based on a judgment result by the judging means, the input status information stored in the input status information storage means in correspondence with the user identification information acquired by the user identification information acquiring means, wherein the output control means comprises output form determining means for determining an output form of a specific string part contained in the message string which is input by the input unit, based on the input status information stored in the input status information storage means in correspondence with the user identification information acquired by the user identification information acquiring means so as to display the specific string part on the output unit of said another of said plurality of game devices.

* * * * *